(12) United States Patent
Chen

(10) Patent No.: US 6,514,645 B2
(45) Date of Patent: Feb. 4, 2003

(54) METHOD OF MAKING A COLOR FILTER

(75) Inventor: Po-Ching Chen, Chung-Tung Chen (TW)

(73) Assignee: Cando Corporation, Hsinchu (TW)

(*) Notice: Subject to any disclaimer, the term of this patent is extended or adjusted under 35 U.S.C. 154(b) by 0 days.

(21) Appl. No.: 10/003,560

(22) Filed: Oct. 31, 2001

(65) Prior Publication Data

US 2002/0098425 A1 Jul. 25, 2002

Related U.S. Application Data

(63) Continuation of application No. 09/801,244, filed on Mar. 7, 2001, now abandoned.

(30) Foreign Application Priority Data

Jan. 20, 2001 (TW) ........................ 90201331 U

(51) Int. Cl.⁷ ............................ G02B 5/20; G02F 1/1335
(52) U.S. Cl. ....................................................... 430/7
(58) Field of Search ............................. 430/7; 349/106, 349/110

(56) References Cited

FOREIGN PATENT DOCUMENTS

| JP | 4-348320 A | * 12/1992 |
| JP | 7-239411 A | * 9/1995 |
| JP | 10-288703 A | * 10/1998 |

* cited by examiner

Primary Examiner—John A. Mcpherson
(74) Attorney, Agent, or Firm—J.C. Patents

(57) ABSTRACT

A color filter substrate includes a substrate, a black matrix, a color filter layer and a common electrode. The black matrix is formed on the substrate and partially distributed on the substrate, wherein the black matrix further includes a resin layer and a light shield layer for lowering the reflectance, and improving the light shielding capability. The color filter layer is formed on the substrate where it is not covered by the black matrix. The common electrode is formed on top of the color filter layer, and the black matrix.

7 Claims, 2 Drawing Sheets

METHOD OF MAKING A COLOR FILTER

CROSS-REFERENCE TO RELATED APPLICATION

This application is a continuation application of, and claims the priority benefit of, U.S. application Ser. No. 09/801,244 filed on Mar. 07, 2001, now abandoned.

BACKGROUND OF THE INVENTION

1. Field of Invention

The present invention relates to a color filter. More particularly, the present invention relates to the black matrix of a color filter.

2. Description of Related Art

Improved driving techniques have made it possible to create a low power consumption, thin, light-weight liquid crystal display (LCD) that works under a relatively low driving voltage. This allows LCDs be broadly used in consumer electronics including home appliances, computers, and projectors . An ordinary thin-film-transistor LCD (TFT-LCD) includes a TFT array substrate, a color filter substrate, and a liquid crystal layer filled between two transparent substrates. The TFT array substrate further includes thin-film transistors, word lines, bit lines, and pixel electrodes. The color filter substrate includes a black matrix, and a color filter. The TFT array substrate and color filter substrate are first aligned and then attached together. After they are aligned, the black matrix of the color filter substrate is placed above the transistors, word lines and bit lines to prevent light leakage therefrom.

Since the purpose of forming a black matrix, which is used as a light shield layer, on the color filter substrate is to prevent light leakage, the black matrix must have good light-blocking characteristics, and a low reflectance. Currently, the most commonly chosen materials for forming a black matrix are either metals (such as chromium Cr), or resins. Chromium provides an excellent light shield layer. However, its metallic surface cannot alone meet the requirement of low reflectance. In order to lower the reflectance, a multi-film method is usually applied, so that the interference caused by the Cr films will reduce the reflection. This conventional multi-film process increases the complexity of manufacturing process, and still cannot provide a satisfactory low reflectance for all frequencies of visible light.

Opposingly resin has a low reflectance for all visible lights, and is made by a manufacturing process similar to the later process for making a color filter layer. However, resin cannot provide an effective light shield layer. For example, in order to have the same light shielding of a 0.1-micrometer Cr layer, the resin layer has to be made 1.2 to 1.5 micrometers thick. As a result, a black matrix of such a thickness will cause a very uneven top profile on the color filter.

According to the foregoing, conventional black matrixes, either made of metals or resins, have drawbacks. Black matrixes made of metals cannot provide low reflectance, even one made by applying multi-film process still cannot provide a satisfactory reflectance for the entire visible range. The excessive thickness of a resin black matrix causes difficulty for later manufacturing processes.

SUMMARY OF THE INVENTION

Accordingly, one object of the present invention is to provide a black matrix for a color filter to reduce the thickness thereof, as well as to lower the reflectance.

A second object of this invention is to provide a method of manufacturing a color filter to reduce reflectance without having an overly-thick black matrix or complicated multi-film process.

To achieve these and other advantages and in accordance with the purpose of the invention, as embodied and broadly described herein, the invention provides a color filter substrate including a transparent substrate, a black matrix, a color filter layer and a transparent common electrode. The black matrix is formed on the substrate, and distributed on partial surface of the substrate, wherein the black matrix further includes a resin layer and a light shield layer for both lowering the reflectance and improving the light shielding capability. In addition, the black matrix of the invention is much thinner than a conventional resin black matrix. The color filter layer is formed on the top surface of the substrate that is not covered by the black matrix. The common electrode is formed on top of the color filter layer, and the black matrix.

The method of the invention begins with forming a black matrix on a color filter substrate, wherein the black matrix includes a resin layer and a light shield layer. A color filter layer including red, green and blue photoresists is next formed on the substrate and filled into the space of the black matrix, and then a transparent common electrode is formed on the black matrix, and color filter.

It is to be understood that both the foregoing general description and the following detailed description are exemplary, and are intended to provide further explanation of the invention as claimed.

BRIEF DESCRIPTION OF THE DRAWINGS

The accompanying drawings are included to provide further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
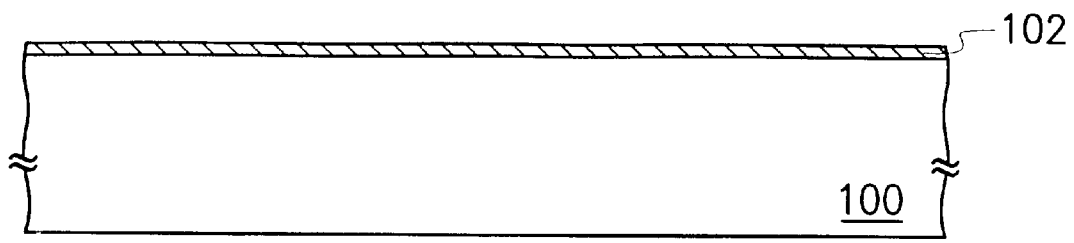
FIGS. 1A to 1E are schematic cross-sectional views of the color filter substrate according to a preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The color filter substrate of this invention and the method of making one are shown in FIGS. 1A to 1E.

As shown in FIG. 1A, a resin layer 102 is formed on a substrate 100, wherein the substrate 100 is, for example, a high-transmittance glass substrate. Various processes, such as spin-on process, can be used to form the resin layer 102. A preferred thickness of the resin layer 102 is about 0.1 micrometers, and the resin layer 102 is preferably made of epoxy or other acrylic resins.

Figure 1B:
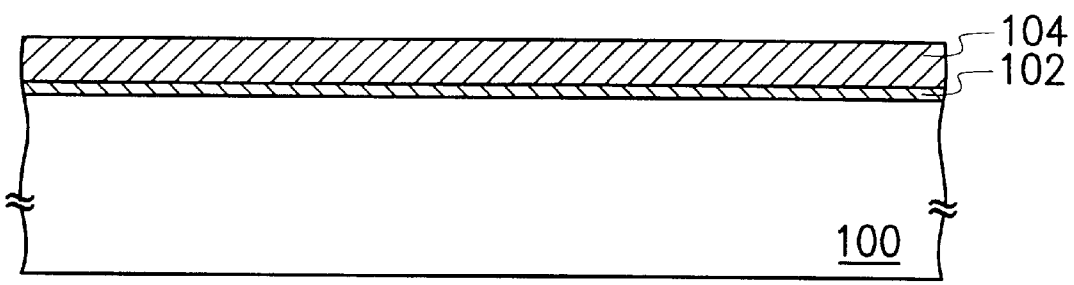

In FIG. 1B, a light shield layer 104, such as chromium (Cr), is formed on top of the resin layer 102. The light shield layer 104 is not necessarily metal, and can be any material with a good light shielding capability. The light shield layer 104 can be formed by a physical vapor deposition, with a preferred thickness of about 0.1 micrometers.

Figure 1C:
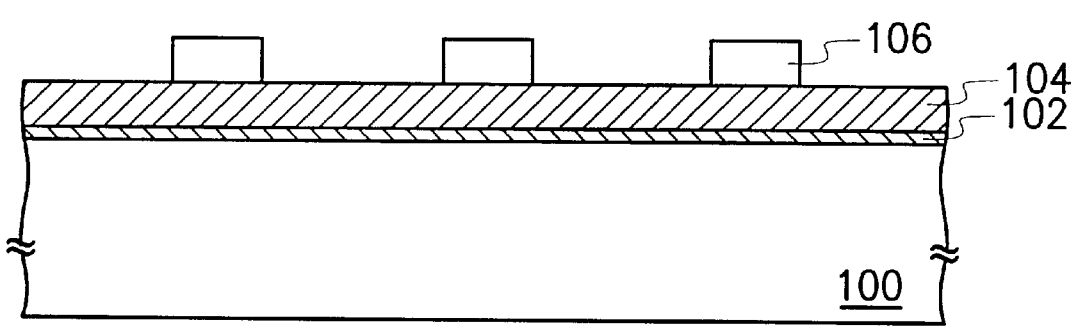
Figure 1D:
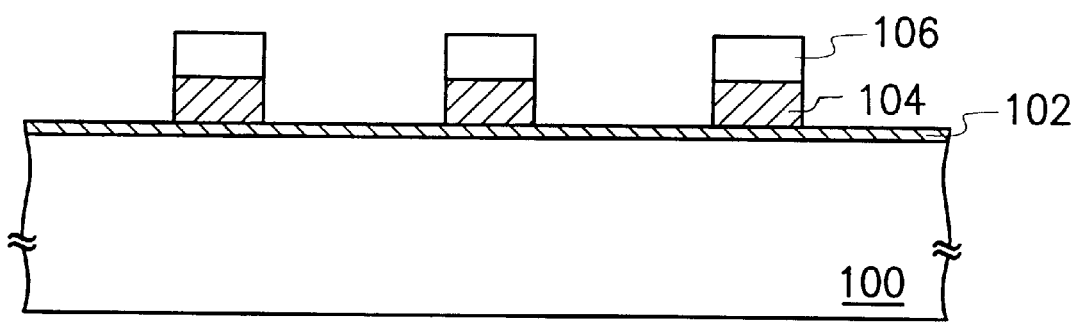

Next in FIG. 1C, a patterned photoresist layer 106 is formed on top of the light shield layer 104 for defining the black matrix of the invention. The photoresist layer 106 is then used as a mask for removing the uncovered light shield layer 104 to expose the resin layer underneath, as shown in FIG. 1D. Then in FIG. 1E, the photoresist layer 106 and the exposed resin layer 102 are removed at the same time to expose a portion of the substrate 100. The remained resin layer 102 and the light shield layer 104 together form the black matrix of the invention 108.

Figure 1E:
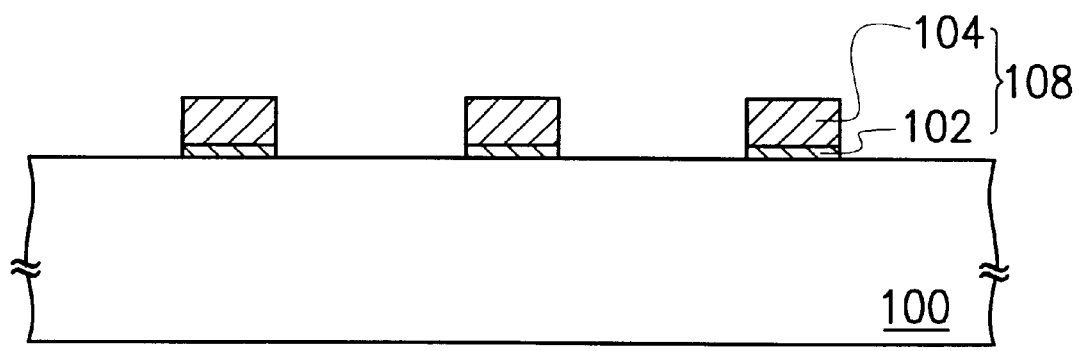

The black matrix 108 of the invention shown in FIG. 1E has several advantages over a conventional one, including a low reflectance provided by the resin layer 102, a good light shielding capability provided by the light shield layer 104, and a reduced thickness. In the presence of the resin layer 102, the thickness of light shield layer 104 can be further thinned to somewhat under 0.1 micrometers, so the thickness of the black matrix 108 is even reduced.

Figure 2:
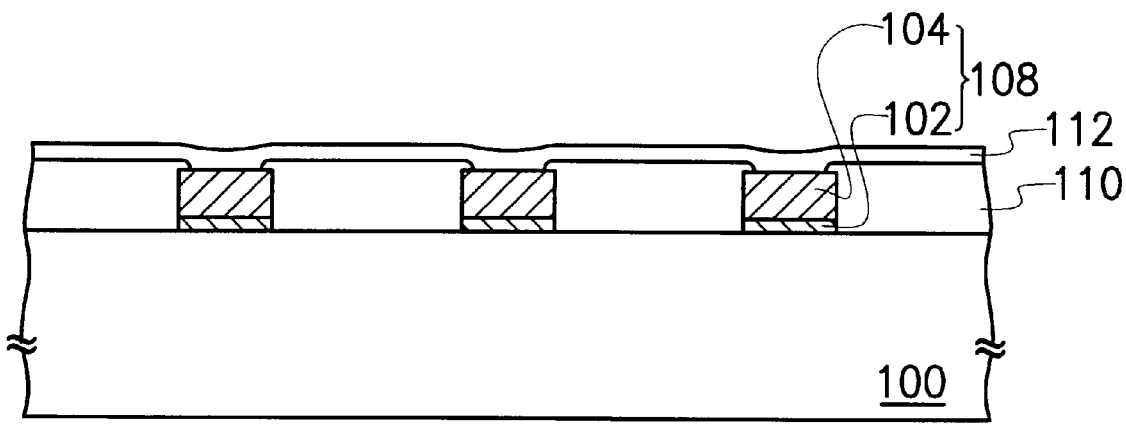
FIG. 2 is a schematic cross-sectional view of the color filter substrate according to the preferred embodiment of the invention.

FIG. 2 schematically shows the color filter substrate of the invention.

The color filter substrate of the invention includes a transparent substrate 100, a black matrix 108 formed on the substrate 100, color filter layer 110, and common electrode 112. The black matrix 108 further includes a resin layer 102, and a light shield layer 104 for providing a low reflectance, and good light shielding capability, as well as a reduced thickness. A portion of the substrate 100 surface area that is not covered by the black matrix 108 is filled with a color filter layer 110, wherein the color filter layer 110 includes dye photoresists of different colors, such as red, green and blue photoresists. A common electrode layer 112 is later formed on top of the black matrix layer 108, and the color filter layer 110.

In summary, the advantages of the invention include:

1. The color filter substrate of the invention provides a low reflectance, and excellent light shielding capability, wherein the resin layer provides a low reflectance, and the light shield layer provides excellent light shielding capability. The combination of resin layer and light shield layer also reduce the total thickness of the black matrix of the invention.

2. The black matrix of the invention is much thinner than a conventional resin black matrix. The black matrix of the invention includes a resin layer having a preferable thickness of about 0.1 micrometers, and a light shield layer having a preferable thickness of about 0.1 micrometers. In contrast, a conventional resin black matrix has a thickness of about 1.2 to 1.5 micrometers. The total thickness of the black matrix of the invention is much thinner than that of a conventional one.

3. The color filter substrate of the invention provides a smoother top profile. The reduction of thickness of the black matrix makes the top profile of the color filter of the invention have a relatively smooth and even top profile, so that later processes can be easily performed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of making a color filter substrate, comprising:

providing a substrate;

forming a resin layer on the substrate;

forming a light shield layer on the resin layer;

forming a patterned photoresist layer on the light shield layer to expose a portion of the resin layer; and removing the photoresist layer and the exposed resin layer at the same time to expose the substrate under the exposed resin layer.

2. The method of claim 1, wherein the resin layer is made of epoxy or acrylic resins.

3. The method of claim 1, wherein the substrate is a high-transmittance glass substrate.

4. The method of claim 1, wherein forming the resin layer is achieved by a spin-on process.

5. The method of claim 1, wherein the light shield layer is made of metal.

6. The method of claim 1, wherein forming the light shield layer is achieved by physical vapor deposition.

7. A method of making a color filter, comprising:

providing a high-transmittance substrate;

forming a resin layer on the substrate;

forming a light shield layer on the resin layer;

forming a patterned photoresist layer on the light shield layer to expose portions of the resin layer;

removing the photoresist layer and the exposed resin layer at the same time until expose the substrate to form a plurality of black matrixes, wherein the black matrix includes the nonremoved the light shield layer and the resin layer thereunder;

filling a color filter layer between the black matrixes; and forming a common electrode layer over the substrate to cover the black matrixes and the color filter layer.

* * * * *